US012037887B2

(12) United States Patent
Zhao et al.

(10) Patent No.: US 12,037,887 B2
(45) Date of Patent: Jul. 16, 2024

(54) REAL-TIME CEMENT BOND LOGGING BASED ON CORRELATION

(71) Applicant: Halliburton Energy Services, Inc., Houston, TX (US)

(72) Inventors: Jiajun Zhao, Houston, TX (US); Ruijia Wang, Singapore (SG); Jonathan Brenda Sue, Bangkok (TH)

(73) Assignee: HALLIBURTON ENERY SERVICES, INC., Houston, TX (US)

( * ) Notice: Subject to any disclaimer, the term of this patent is extended or adjusted under 35 U.S.C. 154(b) by 157 days.

(21) Appl. No.: 17/900,335

(22) Filed: Aug. 31, 2022

(65) Prior Publication Data

US 2024/0068354 A1 Feb. 29, 2024

(51) Int. Cl.
*G01V 1/46* (2006.01)
*E21B 47/005* (2012.01)
*G01V 1/50* (2006.01)

(52) U.S. Cl.
CPC .............. *E21B 47/005* (2020.05); *G01V 1/50* (2013.01)

(58) Field of Classification Search
CPC ... G01V 1/46; G01V 1/48; G01V 1/02; G01V 1/186; G01V 1/50; G01V 2210/62;
(Continued)

(56) References Cited

U.S. PATENT DOCUMENTS 3,697,937 A * 10/1972 Ingram ................ G01V 1/44
367/28
4,255,798 A * 3/1981 Havira ................ E21B 47/005
367/32

(Continued)

FOREIGN PATENT DOCUMENTS

WO 2016130599 A1 8/2016

OTHER PUBLICATIONS

Grosmangin, M. et al., "A Sonic Method for Analyzing the Quality of Cementation of Borehole Casings", J Pet Technol 13 (02): 165-171; SPE-1512-G-PA, Feb. 1, 1961.
Abstract of Kinoshita, Toshihiro et al., "Feasibility and Challenge of Quantitative Cement Evaluation with LWD Sonic", SPE-166327-MS; SPE Annual Technical Conference and Exhibition, New Orleans, Louisiana, USA, Sep. 30, 2013.
Abstract of Pistre, V. et al., "Attenuation-Based Quantitative Cement Bond Index with LWD Sonic: A Novel Approach Applicable to all Casing and Cement Cases", SPE-170886-MS; SPE Annual Technical Conference and Exhibition, Amsterdam, The Netherlands, Oct. 27, 2014.

(Continued)

*Primary Examiner* — Edwin J Toledo-Duran
(74) *Attorney, Agent, or Firm* — NOVAK DRUCE CARROLL LLP

(57) ABSTRACT

Aspects of the subject technology relate to systems and methods for identifying the quality of cement bonding of an exterior surface of a wellbore casing to an Earth formation. Methods of the present disclosure may allow for bond indexes to be identified in real-time as a cementing operation is performed even when tools that perform the cementing operation generate acoustic noise that interfere with measurements used to evaluate cement bonding quality. These methods may include transmitting acoustic signals, receiving acoustic signals, filtering the received acoustic signals, identifying magnitude and attenuation values to associate with the received acoustic signals, and comparing trends in the magnitudes with the identified attenuation values. These methods may also include correcting attenuation values associated with measured data based on a set of correction rules such that bond indexes can be identified. Such correction rules may be associated with data generated by a computer model.

20 Claims, 11 Drawing Sheets

(58) Field of Classification Search
CPC ........... G01V 2210/74; G01V 2200/14; G01V 2210/55; G01V 1/208; G01V 2210/1299; G01V 2210/21; G01V 2210/1429; G01V 2210/614; G01V 2210/66; G01V 2210/121; E21B 47/005; E21B 2200/20

See application file for complete search history.

(56) References Cited

U.S. PATENT DOCUMENTS

| | | | | |
|---|---|---|---|---|
| 5,763,773 | A * | 6/1998 | Birchak | E21B 47/005 73/152.58 |
| 2005/0128873 | A1 * | 6/2005 | LaBry | G01V 1/48 367/35 |
| 2007/0131417 | A1 * | 6/2007 | Bolshakov | E21B 47/005 166/253.1 |
| 2014/0365133 | A1 * | 12/2014 | Elkington | G01V 1/50 702/14 |
| 2015/0293213 | A1 * | 10/2015 | Felber | G01S 7/521 367/137 |
| 2015/0369939 | A1 * | 12/2015 | Pistre | G01V 1/50 367/35 |
| 2016/0025884 | A1 * | 1/2016 | Difoggio | E21B 47/107 367/25 |
| 2020/0033494 | A1 * | 1/2020 | Patterson | E21B 49/00 |
| 2020/0150304 | A1 * | 5/2020 | Han | G01N 29/46 |
| 2021/0033742 | A1 * | 2/2021 | Topping | G01V 1/46 |
| 2021/0142515 | A1 * | 5/2021 | Luu | G06F 16/215 |
| 2022/0373706 | A1 * | 11/2022 | Cabella | G01N 33/383 |
| 2022/0381935 | A1 * | 12/2022 | Cabella | E21B 47/107 |

OTHER PUBLICATIONS

Abstract of Izuhara, W. et al., "Full-Range Quantitative Cement Bond Evaluation with LWD Sonic: The Right Way of Approach Using a Hybrid of Amplitude and Attenuation", SPE-187436-MS; SPE Annual Technical Conference and Exhibition, San Antonio, Texas, USA, Oct. 9, 2017.

Watanabe, Shin'ichi et al., "Realiability Indication of Quantitative Cement Evaluation with LWD Sonic", The 20th Formation Evaluation Symposium of Japan, Oct. 1-2, 2014.

International Search Report & Written Opinion; PCT Application No. PCT/US2023/021333; mailed Aug. 25, 2023.

Abstract of Tang et al., "An acoustic-wave theory for casing bond evaluation using viscoelastic slip boundary modeling", Science China Earth Sciences; May 24, 2018; vol. 61, pp. 1-8; p. 2.

* cited by examiner

REAL-TIME CEMENT BOND LOGGING BASED ON CORRELATION

TECHNICAL FIELD

The present disclosure is generally directed to the processing of data sensed in a wellbore. More specifically, the present disclosure is directed to improving the processing of data that may be used to control tools located within the wellbore.

BACKGROUND

Cementing an oil or gas well includes pumping cement into an annulus between the casing and a rock formation or between two casings after a well is drilled. This is a key step of well completion to keep formation integrity. For cementing quality control, it is necessary to quantitatively measure the bonding condition at the interfaces between casing, cement, and a rock formation. Cement bond logging (CBL) plays an important role in determining well integrity and CBL is a way to ensure that a wellbore has acceptable levels of zonal isolation. Thus, CBL is an important topic in acoustic well logging. A process of generating cement bond logs while cement is pumped into the annulus of the wellbore is referred to herein as logging-while-drilling (LWD). Creating cement bond logs during a cementing operation could provide oil and gas companies with benefits that include cost reduction, reduction in tool decentering effects, and mitigating tool conveyance issues.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
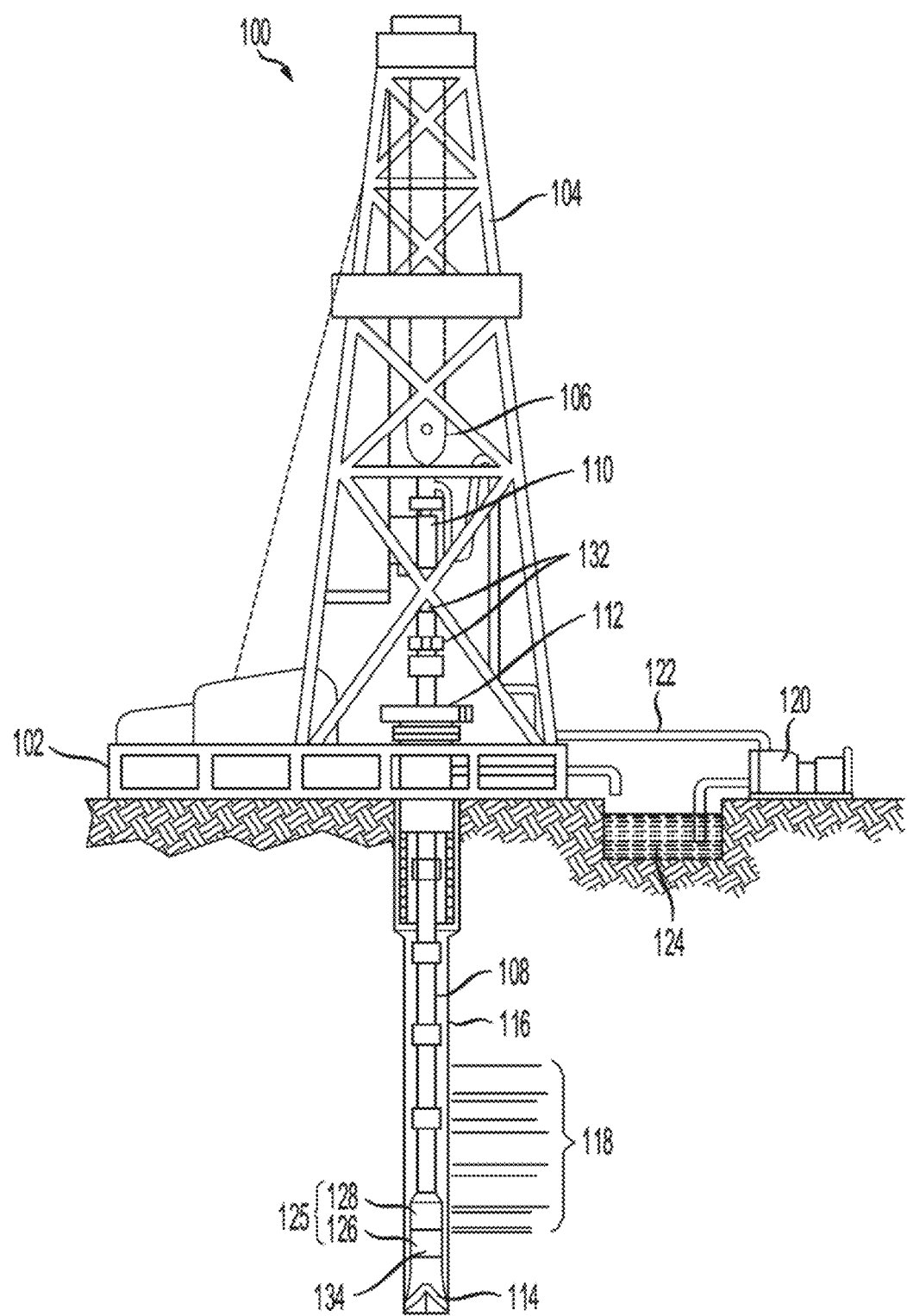
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Aspects of the subject technology relate to systems and methods for identifying the quality of cement bonding of an exterior surface of a wellbore casing to an Earth formation. Methods of the present disclosure may allow for bond indexes to be identified in real-time as a cementing operation is performed even when tools that perform the cementing operation generate acoustic noise that interfere with measurements used to evaluate cement bonding quality. These methods may include transmitting acoustic signals, receiving acoustic signals, filtering the received acoustic signals, identifying magnitude and attenuation values to associate with the received acoustic signals, and comparing trends in the magnitudes with the identified attenuation values. These methods may also include correcting the attenuation values data based on a set of correction rules such that bond indexes can be identified. Such correction rules may be associated with data generated by a computer model.

Cementing an oil or gas well includes pumping cement into an annulus between the casing and a rock formation or between two casings after a well is drilled. This is a key step of well completion to keep formation integrity. For cementing quality control, it is necessary to quantitatively measure the bonding condition at the interfaces between casing, cement, and a rock formation. Cement bond logging (CBL) plays an important role in determining well integrity and CBL is a way to ensure that a wellbore has acceptable levels of zonal isolation. Thus, CBL is an important topic in acoustic well logging. A process of generating cement bond logs while cement is pumped into the annulus of the wellbore is referred to herein as logging-while-drilling (LWD). Creating cement bond logs during a cementing operation would provide oil and gas companies with benefits that include cost reduction, reduction in tool decentering effects, and mitigating tool conveyance issues. Despite these potential advantages, there is an LWD-specific challenge related to background noise generated by tools that provide cement to the annulus of the wellbore. Such background noise may be referred to as "tool waves" or "tool sound waves." When an acoustic transmitter and one or more acoustic receivers are used to collect data relating to the quality of a wellbore annulus cementing operation, the acoustic transmitter transmits sound waves that travel along the casing of the wellbore. Collecting data relating to the attenuation of acoustic sound waves as they travel along the casing is important as levels of attenuation can be used to identify whether areas of the wellbore are cemented to an acceptable level of quality or bond index. As such, measurements of levels of transmitted acoustic sound waves received by one or more acoustic receivers may be used to demonstrate that a wellbore has been fabricated to an acceptable level of quality. The term "casing arrivals" is used herein to describe acoustic sound waves that are received by one or more receivers after those sound waves traveled along a wellbore casing after being transmitted by an acoustic transmitter of a LWD tool. Characteristics of these casing arrivals may be used to identify measures of wellbore cement quality using methods may identify amounts of acoustic attenuation. Typically, areas of a wellbore that are cemented with a high quality will be associated with higher levels of acoustic attenuation than areas of the wellbore that are cemented with a lower quality. This is because, areas of the well that have little to no gap between areas where the cement is located and an Earth formation result in sonic waves being transmitted to and absorbed by the Earth formation where areas of the well that have larger gaps between the cement and the Earth formation result in the sonic waves not being as readily transmitted to and absorbed by the Earth formation.

When cement bond logs are created during a cementing operation, tool waves travel along the LWD tool are also received by the receivers. Amplitudes of these tool waves may be much larger than casing wave arrival amplitudes. Consequently, estimates relating to received casing wave amplitudes may be degraded or biased because of tool wave background noise. Additionally, estimates of casing wave attenuations suffer from the existence of tool wave arrivals because the relation between attenuation and cement bond indices may no longer be monotonic. This non-monotonic effect can affect the accuracy of measurements that are used to identify the quality of the wellbore cementing operation. What are needed are new methods and apparatus that allow an apparatus to interpret received casing wave energy even in noisy environments.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the both drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
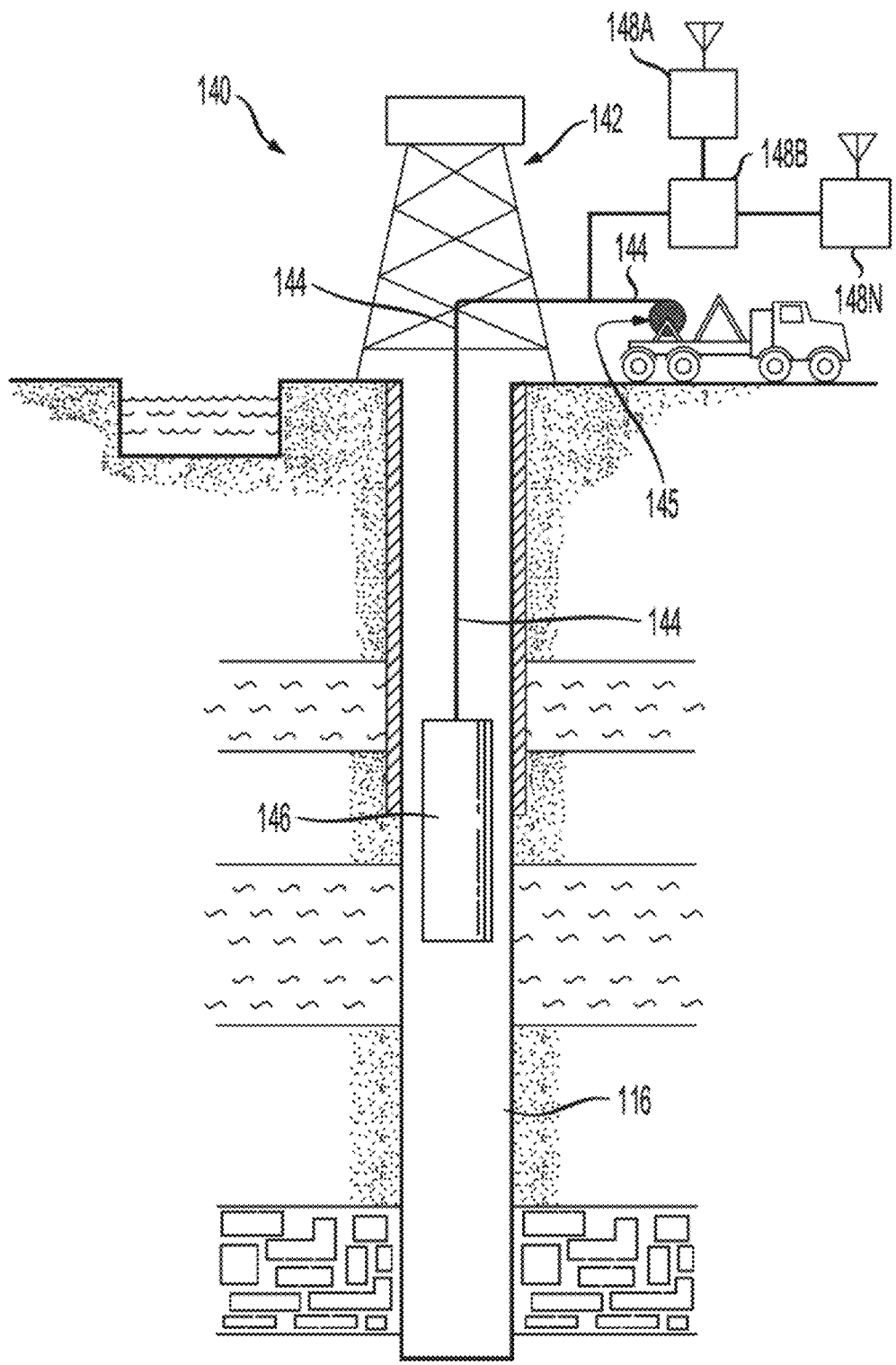
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic imager tool can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2:
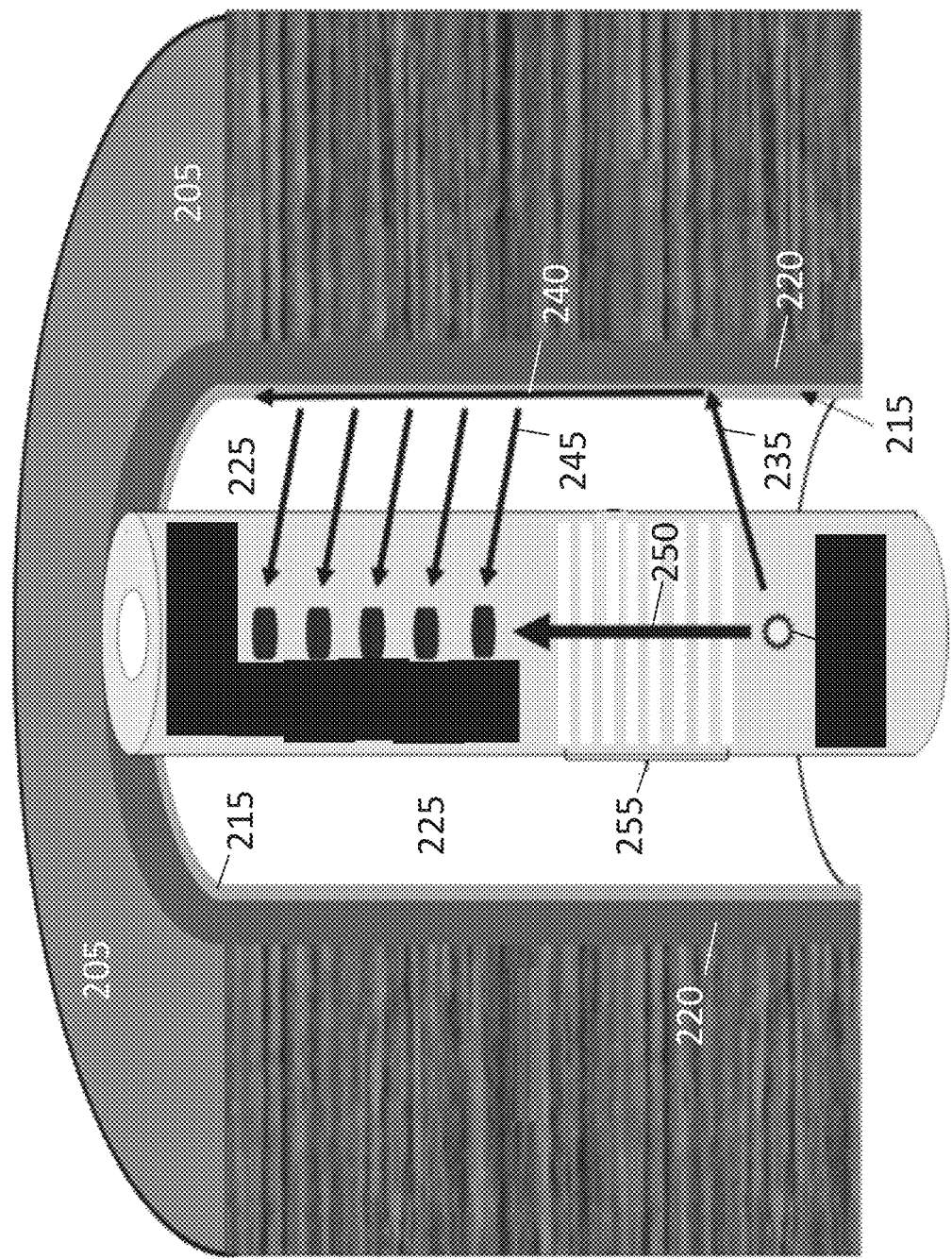
FIG. 2 illustrates a wellbore that is monitored in real-time as a wellbore cementing operation is performed.

FIG. 2 illustrates a wellbore that is monitored in real-time as a wellbore cementing operation is performed. FIG. 2 includes a hole 225 in formation 205 that includes casing 215 into which tool 210 has been inserted during a wellbore cementing operation. Casing 215 may be made using threaded steel pipes that are joined together as the wellbore is made. As tool 210 moves down the wellbore, cement may be pumped to fill spaces between an outside surface of casing 215 and formation 205. In certain instances, area 225 located between tool 210 and internal surfaces of casing 215 may be initially filled with a drilling mud. Cement may then be pumped to fill gaps between then casing 215 and the formation 205 and the pumping of the cement may displace this mud. At this time acoustic waves 235 may be transmitted from transmitter 230 toward casing 215. These transmitted acoustic waves 235 impact casing 215 and travel along casing 215 upward as indicated by arrow 240 (i.e., acoustic waves 240). After traveling up casing 215, energy from acoustic waves 245 travels back toward tool 210 as acoustic waves 245 to receivers R1-R5 (R1, R2, R3, R4, and R5). As the acoustic waves 245 are received at receivers R1-R5, characteristics associated with those received waves may be used to identify whether and to what extent cement has filled areas 220 between an outer surface of casing 215 and formation 205. Generally, areas on the outside of casing 215 that are bonded to the formation 205 with cement will be associated with greater levels of acoustic attenuation than areas where the outside of casing 215 are not bonded to the formation 205. This is because acoustic attenuation values tend to increase with the quality of cement bonds. Because of this, analysis may be performed on received acoustic energy from acoustic waves 245 to identify the quality of a wellbore cementing process.

Energy from vibrations associated with the pumping of the cement are illustrated by arrow 250. Such vibrations may be referred to as tool waves 250 that have the potential to interfere with accurately measuring acoustic attenuation values. Tool 210 includes isolator 255 that is designed to dampen tool waves 250 before those waves reach receivers R1-R5 in an effort to mitigate tool waves 250 from interfering with real-time measurements of casing wave magnitudes and related determinations of acoustic attenuation. Since isolator 255 is not perfect, some of the energy from tool waves 250 is still received by receivers R1-R5. As mentioned above, energy from tool waves 250 received by receivers R1-R5 may interfere with measurements and acoustic attenuation value determinations. Furthermore, acoustic energy from any exterior source received by receivers R1-R5 may interfere with the process of determining the quality of wellbore bonds. Because of this, methods of the present disclosure may include making compensations to measured acoustic attenuation values when actual or real acoustic attenuation values are identified.

Figure 3:
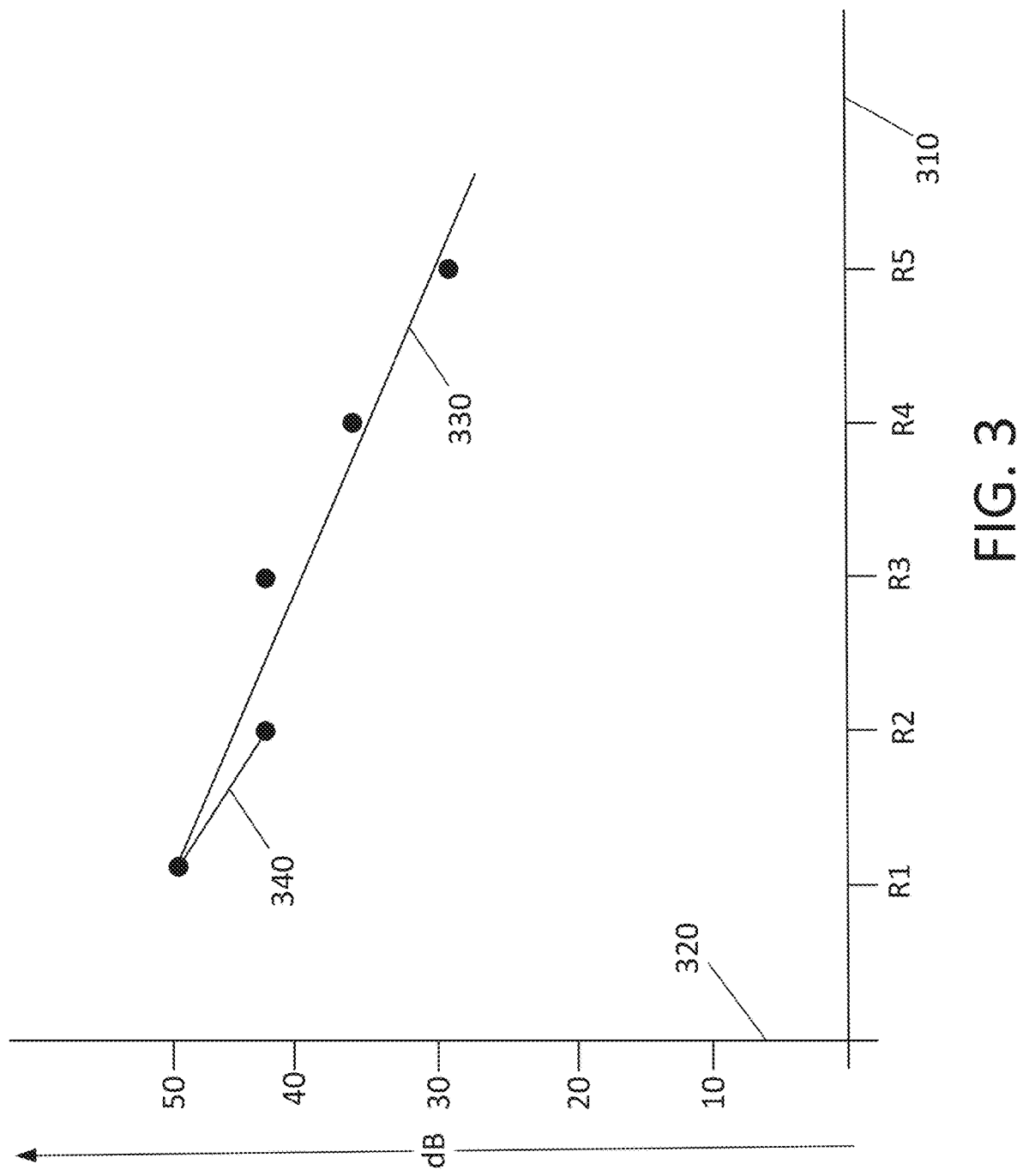
FIG. 3 illustrates a series of points that correspond to energy received by respective receivers of a wellbore tool used to evaluate the quality of the wellbore cementing process.

FIG. 3 illustrates a series of points that correspond to energy received by respective receivers of a wellbore tool used to evaluate the quality of the wellbore cementing process. FIG. 3 includes a horizontal axis 310 that identifies a receiver number (R1, R2, R3, R4, and R5) and a vertical axis 320 that identifies a magnitude that may be measured in decibels (dB) of acoustic energy received by each receiver R1-R5 at a moment in time. Note that in FIG. 3 the magnitude of acoustic energy received by receiver R1 is greater than amounts of acoustic energy received by the other receivers R2-R5. This reduction in magnitude corresponds to an amount of attenuation of acoustic waves that travel up a wellbore casing. Once the magnitudes of acoustic energy received at each receiver are identified, a curve or line 330 may be drawn by a curve fitting process. In an ideal case, each of the points in FIG. 3 may be located precisely on line 330, since the wellbore environment is not ideal, each of a set of points associated with a particular measurement do not lie perfectly on line 330. Line 330 may have been identified using curve fitting functions or mathematical calculations.

Because of the attenuation of acoustic energy over distance, line 330 has a slope that corresponds to an average change in acoustic energy received at each respective receiver R1-R5. Line 330 is, therefore, a general attenuation curve that may be used to identify an amount of attenuation (ATT) of acoustic energy that may be measured in decibels (dB) per foot (ft) or dB/ft. Such measurements may be collected as a wellbore tool moves down a wellbore during a cementing operation. These measurements may be part of a set of data that associates apparent amounts of attenuation ATT measured in dB/ft with different portions of a wellbore. Here, the greater the slope, the greater an amount of attenuation per foot.

Note also that FIG. 3 includes line 340 that includes only two points, a first point that identifies a magnitude of acoustic energy received by receiver R1 and a magnitude of acoustic energy received by receiver R2. Line 340 has a slope that is larger than the slope of line 330. Methods of the present disclosure may make determinations based on the slope of curve 330. Additionally, or alternatively these methods may identify a difference in the slopes of line 340 and line 330. In an instance when the magnitude received by receiver R1 is 50 dB, the magnitude received by receiver R5 is 28 dB, and the distance between receivers R1 and R5 is five feet, the slope of line 330 would equal (50−28)/5=5.6 dB/ft. The slope of line 340 may be calculated using a similar equation that uses the magnitude of acoustic energy received by receiver R1 minus the magnitude of acoustic energy received by receiver R2. When the magnitude of acoustic energy received by receiver R1 is 50 dB, the magnitude of acoustic energy received by receiver R2 is 41.2 dB and the distance between receivers R1 and R2 is one foot, the slope of line 340 is (50−41.2)/1=8.8 dB/ft. The difference in slopes of curves 340 and 330 would then be 8.8−5.6=3.2. Such a difference in slope between two curves may be referred to as delta of an apparent attenuation or Del-APP-ATT that may also be measured in dB/ft.

The acoustic noise from a cement pump that generates the acoustic waves 250 of FIG. 2 may result in an apparent magnitude of casing transmitted acoustic energy to be higher or lower than actual levels of casing transmitted acoustic energy. This is because acoustic energy from acoustic waves 250 or from other sources may add to or subtract from the acoustic energy used to check the quality of a wellbore cementing process. Tool wave noise, thus, may be at least partially responsible for the data points of curve 330 not lying precisely on curve 330.

Figure 4:
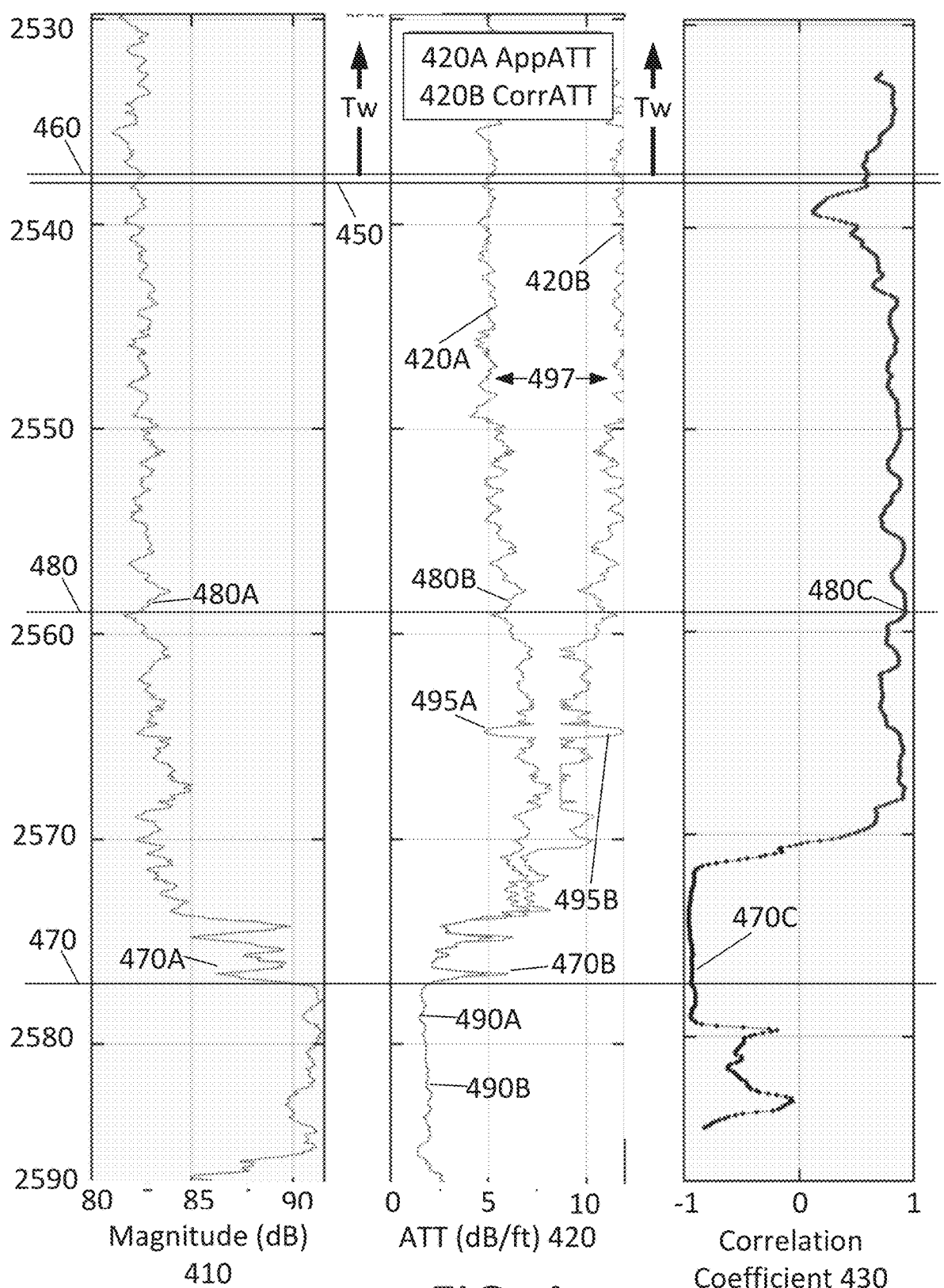
FIG. 4 illustrates several sets of curves that associate wellbore locations, magnitudes of acoustic energy and measures of attenuation per foot with correlation coefficients derived from acoustic energy received by the receivers discussed in respect to FIG. 2.

FIG. 4 illustrates several sets of curves that associate wellbore locations, magnitudes of acoustic energy and measures of attenuation per foot with correlation coefficients derived from acoustic energy received by the receivers discussed in respect to FIG. 2. The wellbore locations of FIG. 4 may correspond to wellbore depths that range from 2530 feet to 2590 feet. FIG. 4 includes a magnitude curve 410, a set of attenuation curves (ATT (dB/ft) 420, and a correlation coefficient curve 430. A dataset associated with magnitude curve 410 may include data sensed by the receivers as discussed in respect to FIG. 2. Curve 410 associates wellbore depths (between 2530 feet and 2590 feet) with magnitudes of measured acoustic energy that vary between about 80 dB and 90 dB.

The set of attenuation curves 420 includes curve 420A and curve 420B, curve 420A shows values of apparent attenuation and curve 420B shows values of corrected attenuation. Note that the scales of curve set 420 associate wellbore depth values (between 2530 feet and 2590 feet) with values of attenuation per foot (ATT (dB/ft)) that vary between values of 0 dB/ft and about 12 dB/ft. Note also that curves 420A and 420B are distinct from each other between depths of 2530 feet and 2573 feet. After about 2573 feet, curves 420A and 420B overlap and can no longer easily be distinguished from each other because of this overlap.

The dataset associated with magnitude curve 410 may include data sensed by the receivers discussed in respect to FIG. 2. Trends associated with the magnitude curve 410 may be compared to trends associated with the apparent attenuation curve 420A of curve set 420. Such trends may be identified by observing changes in measure of magnitude and changes in magnitudes of apparent attenuation over several sample points. When a trend of magnitude curve 410 moves in a same direction as a trend of apparent attenuation curve 420A, the magnitude trend may be said to correspond to the apparent attenuation trend. Such corresponding values in trends result in a correlating coefficient value that is more positive. Strong correlation between a magnitude trend and an apparent attenuation trend may be associated with a maximum correlation coefficient of 1. When a magnitude trend and an attenuation trend move in opposite directions, a value of correlation coefficient will reduce. Trends in magnitudes may be identified from data from a single receiver, for example receiver R1 of FIG. 2.

Horizontal lines 450 and 460 may be associated with a sliding window that may move in the direction of arrowed lines Tw. This sliding window may correspond to a change in time or depth. Within a particular sliding window, several values of measured magnitude and apparent attenuation may be evaluated to identify respective trends. Values of correlation coefficient may be identified or be updated based on how the magnitude trend and apparent attenuation trend correlate with each other over the several values of measured magnitude and apparent attenuation included in a window. Horizontal line 470 may be associated with a magnitude trend around point 470A and an attenuation trend 470B. Note that the trend at point 470A is associated with a reduction in magnitude curve 410 and an increase in attenuation at point 470B, this is an opposite trend that results in a measure of correlation coefficient moving more negative (towards a value of −1) around point 470C of correlation coefficient curve 430. Horizontal line 480 may be associated with a magnitude trend around point 480A and with an attenuation trend around point 480B, this is a corresponding trend that results in a measure of correlation coefficient more positive (towards a value of 1) around point 480C.

The corrected attenuation curve 420B may be generated by correcting respective values in apparent attenuation curve 420A based on respective values in the correlation coefficient curve 430 and a set of correction rules. Such correction rules may specify that when values of the correlation coefficient curve 430 are positive, a first type of correction may be applied to respective values of the apparent attenuation curve 420A. These correction rules may also identify that when values of the correlation coefficient curve 430 are negative and when the apparent attenuation values are less than a threshold value, no correction may be applied. Furthermore, the correction rules may identify that when values of the correlation coefficient curve 430 are negative and when the apparent attenuation values are not less than the threshold value, a second type of correction may be performed. Note that the rules discussed above may result in no correction being applied at point 490A based on a value of correlation coefficient being negative and being less than a threshold value of 4 dB and that a correction should be applied at point 490B based on a value of correlation coefficient being negative an at or above the threshold level of 4 dB. These correction rules may also be used to correct a dip in the apparent attenuation curve at point 495A of curve 420A that results in this dip being transformed into peak at point 495B of curve 420B. Furthermore, the correction rules may result in a base line shift between curves 420A and 420B identified by double arrowed line 497.

Alternatively, or additionally, a set of correction rules may use values of apparent attenuation to identify how much of a correction to apply to values of the apparent attenuation curve 420A. For example, when the correlation coefficient is negative and approximate attenuation values are less than 4 dB/ft may result in no correction being applied. These alternative or additional correction rules may also identify that When attenuation values less between 4 dB/ft and 7 dB/ft when the correlation coefficient is negative that only a small correction should be performed (for example by shifting data points of curve 420A by +0.5 dB/ft). Another alternative or additional correction rule may identify an amount of shifting that should be applied to data points of curve 420A when the correlation coefficient is greater than zero. As such decisions relating to whether certain corrections should be made, and level amount shifts dB/ft shifts to apply to correct points of an apparent attenuation curve may be based on whether the correlation coefficient is positive or negative. Alternatively, or additionally, such decisions and amounts of shift may be based on specific threshold vales of apparent attenuation and these shift amounts may be different based on values of correlation coefficient values and/or computer models. Additional discussion of how a computer model may be used to correct values of an approximate attenuation curve are discussed in respect to FIG. 7 of this disclosure.

Figure 5:
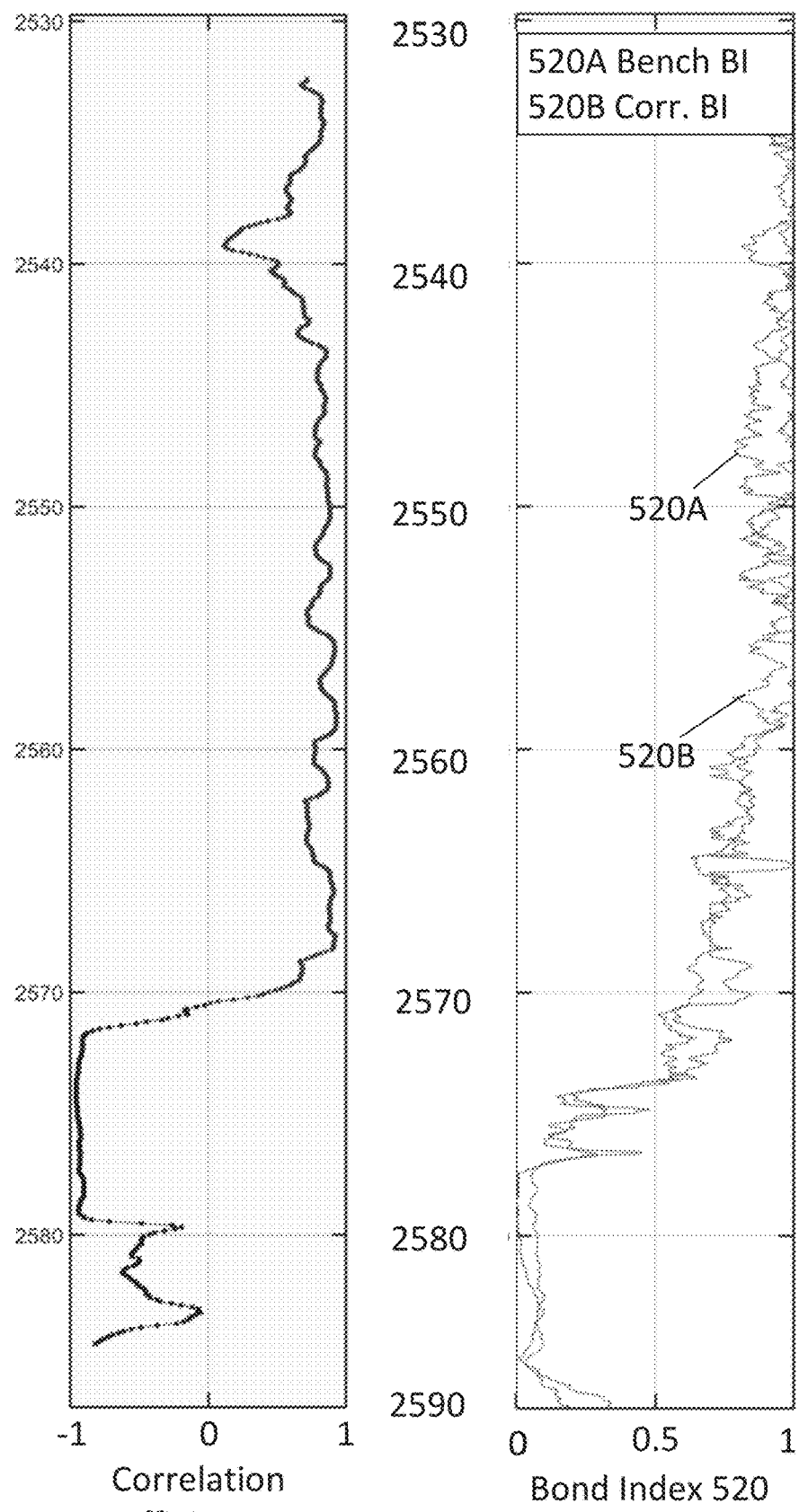
FIG. 5 illustrates a correlation coefficient curve that includes data from which curves of a bond index curve set.

FIG. 5 illustrates a correlation coefficient curve that includes data from which curves of a bond index curve set. The correlation curve 510 of FIG. 5 is the same as the correlation curve 430 of FIG. 4. The bond index curves 520 include a benchmark bond index curve 520A and a corrected bond index curve 520B. The bond index curves 520 may have been identified based converting the scale correlation coefficient values that vary from −1 to 1 to a bond index scale that varies from values of 0 to 1. Values of bond index close to 1 may identify locations that have very good adhesion of cement to a ground formation (less than a first threshold gap between the cement the ground formation) and values of bond index close to 0 may identify locations that have poor adhesion of cement and the ground formation (more than a second threshold gap between the cement and the ground formation). Curve 520A may correspond to a scale conversion of corrected apparent attenuation curve 420A of FIG. 4 and curve 520B may correspond to a scale conversion of the corrected attenuation curve 420B of FIG. 4.

Figure 6:
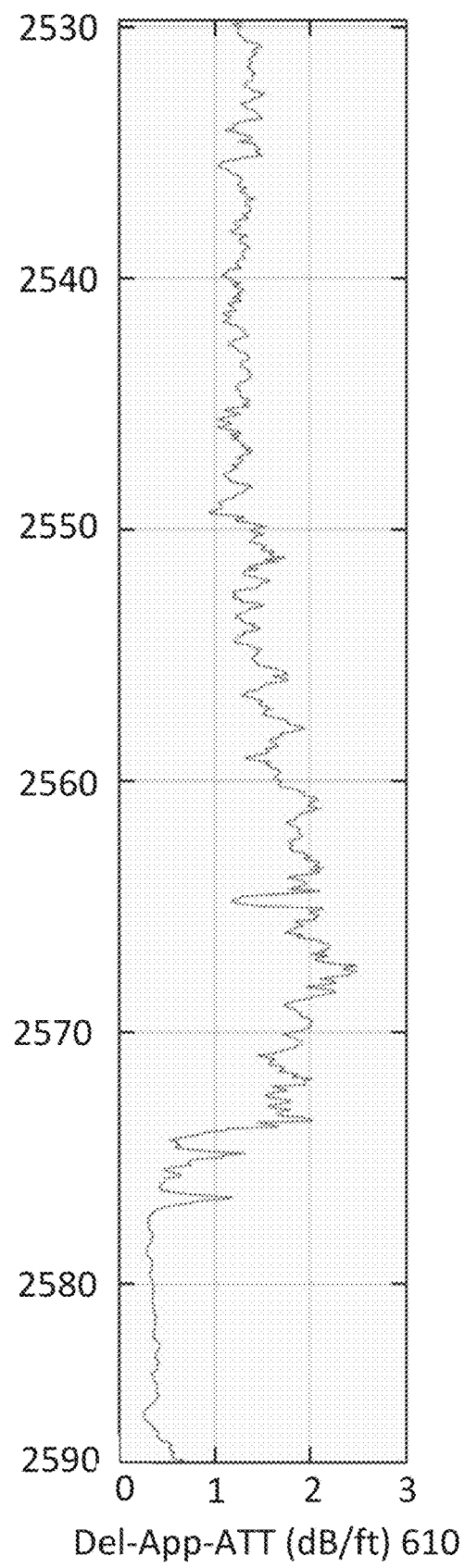
FIG. 6 illustrates a delta apparent attenuation curve that is like the apparent attenuation curve of FIG. 4.

FIG. 6 illustrates a delta apparent attenuation curve that is like the apparent attenuation curve 420A of FIG. 4. The same types of evaluations described in respect to FIGS. 4-5 may be performed by comparing trends associated with magnitude curve 410 of FIG. 4 to generate a correlation coefficient curve that may be similar to correlation coefficient curve 430. Evaluations discussed in respect to FIG. 4 may be used to identify a corrected delta apparent attenuation curve that is not shown in FIG. 6. Here again correction rules may be applied to identify whether data points of curve 610 that should be corrected or not and the rules may also identify amounts of correction to apply. These correction amounts may be specified in dB/ft shifts. Scaling factors of 0 to 3 shown in FIG. 6 may be rescaled when bond index curves associated with the delta apparent attenuation curve 610 are generated. Like the like bond index curves 520 of FIG. 5, bond index curves generated from values of the delta apparent attenuation curve 610 may range from a value of zero to a value of 1.

Figure 7:
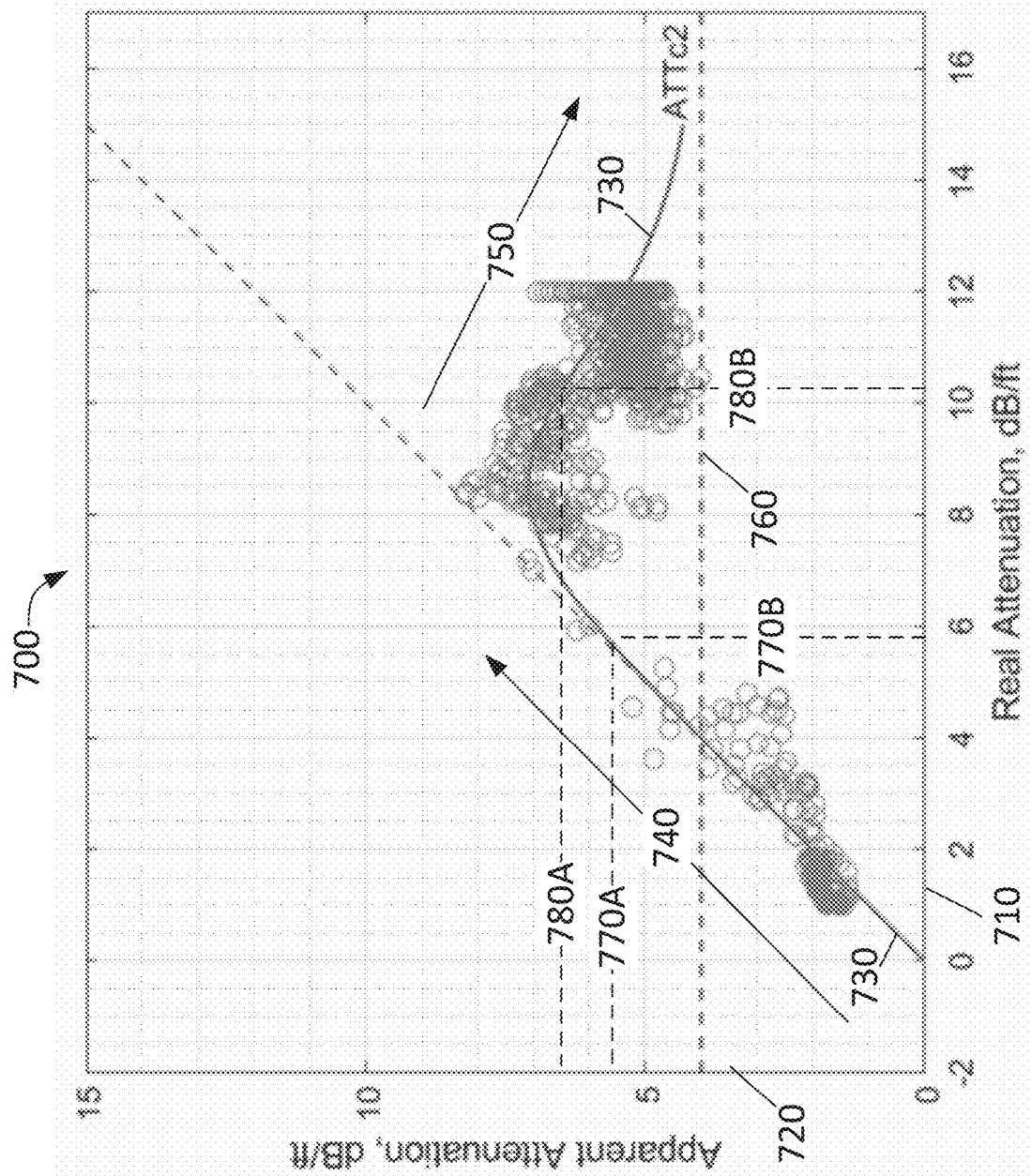
FIG. 7 illustrates a graph that may be used to identify measures of correction to apply to different values of an apparent attenuation curve.

FIG. 7 illustrates a graph that may be used to identify measures of correction to apply to different values of an apparent attenuation curve. Graph 700 of FIG. 7 includes a horizontal axis 710 and a vertical axis 720 used to cross-reference values of apparent attenuation to values of attenuation that may be considered to be actual or "real" values of attenuation. These actual or real attenuation values may correspond to corrected attenuation values included in curve 420B of FIG. 4. Another item included graph 700 is curve 730 that may have been generated by a computer model. The curve 730 includes a rising part identified by arrowed line 740 that has a positive slope and a falling part identify by arrowed line 750 that has a negative slope. Graph 700 includes a horizontal line 760 that may correspond to a threshold of a correction rule. Graph 700 also includes a plurality of circles that are not identified with numeric identifiers, each of these circles may represent data points of measured acoustic signal magnitudes. Curve 730 is may have been generated based on a theoretical summation model. This theoretical summation model can be adjusted or fine-tuned by fitting prior field data to other experimental data.

The positive slope 740 of curve 730 may correspond to negative values of correlation coefficients discussed in respect to FIG. 4. The negative slope 750 of curve 730 may correspond to positive values of correlation coefficient values discussed in respect to FIG. 4. Graph 700 may be used to convert apparent attenuation values to real attenuation values when a corrected set of attenuation values are identified. A set of rules used to covert apparent attenuation values to real/corrected attenuation values may include:

When an apparent attenuation data point is located along the rising part of curve 730 and has a value that is below threshold line 760—do not perform a correction.

When an apparent attenuation data point is located along the rising part of curve 730 and has a value located on or above the threshold line 760—perform a correction.

When an apparent attenuation data point is located along the falling part of curve 730—perform a correction.

As mentioned above, the rising part of curve 730 may correspond to data points that are associated with a negative correction coefficient value and the falling part of curve 730 may correspond to data points that are associated with a positive correlation coefficient value. Corrections that are performed may include identifying an attenuation value for a given data point and drawing horizontal line 770A from the 5.5 dB/ft value of apparent attenuation at the vertical apparent attenuation axis 720 to a point of curve 730 that corresponds to either the rising part of or the falling part of curve 730 according to the correction rules. Since the given data point of the 5.5 dB/ft apparent attenuation for corresponds to rising part of curve, line 770A intersects curve 730 at a point as shown in FIG. 7 (where lines 770A and 770B intersect). Next, vertical line 770B may be drawn from this intersection point to the real attenuation axis 710 at a value of real attenuation of about 5.9 dB/ft.

When an apparent attenuation value associated with a data point of the falling part of curve 750 is corrected, a similar set of steps may be performed according to the correction rules. Here horizontal line 780A is drawn from a value of apparent attenuation of 6.5 dB/ft to a point that intersects the falling part of curve 730 and then line 780B is drawn from this intersection point to the real attenuation axis. In this instance, the apparent attenuation value of 6.5 dB/ft is corrected to a value of about 10.1 dB/ft. Notice that based on the shape of curve 730, corrections associated with the rising part of curve 730 are less (e.g. 5.5 dB/ft is corrected to 5.9 dB/ft) than corrections associated with the falling part of curve 730 (e.g. 6.5 dB/ft is corrected to 10.1 dB/ft).

While the corrections discussed in respect to FIG. 7 review drawing horizontal and vertical lines, a processor executing a set of correction instructions may perform this task using computations or a lookup table instead of drawing lines. As mentioned above, data points of curve 730 may have been identified based on a computer model where the processor may have executed instructions out of a memory to identify points along line 730 based on constraints of the computer model.

Figure 8:
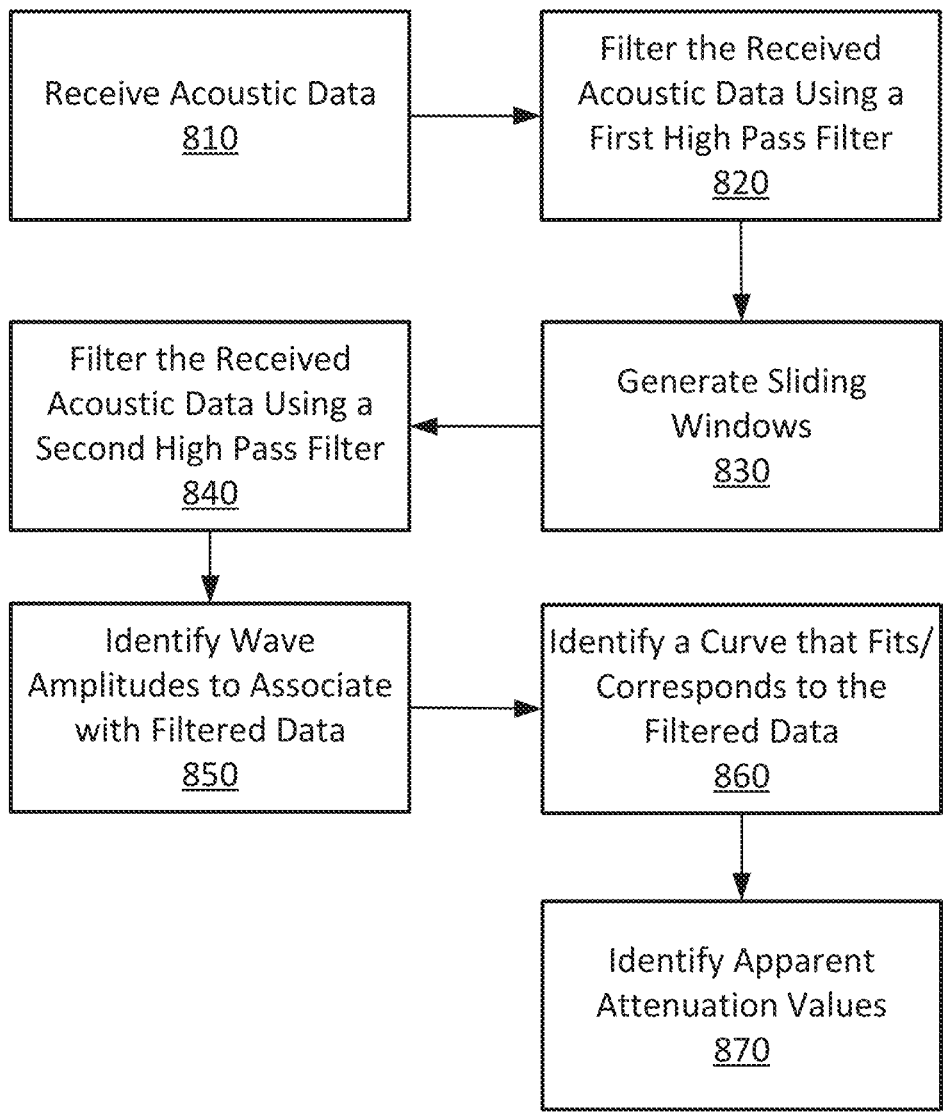
FIG. 8 illustrates a series of steps that may be performed when sets of received acoustic data are processed to identify apparent attenuation values associated with received acoustic data.

FIG. 8 illustrates a series of steps that may be performed when sets of received acoustic data are processed to identify apparent attenuation values associated with received acoustic data. FIG. 8 begins with step 810 where acoustic data is received. This acoustic data may be received by one or more receivers like the receivers of FIG. 2 after acoustic waves have been transmitted from an acoustic wave transmitter. Next in step 820, the received acoustic data may be filtered using a first high pass filter. This first high pass filter may be referred to as a gentle high pass filter and may have a cutoff frequency somewhere between 1000 Hertz (Hz) and 4000 Hz. After step 820, sliding windows may be generated such that data points associated with the received acoustic data may be evaluated for magnitude trends. Here again these windows may be associated with a time and/or with a depth of a well. These windows may also be used to compare magnitude trends with trends in apparent acoustic data or in delayed apparent acoustic data.

The received acoustic data may be filtered in step 840 using a second type of high pass filter that may be referred to as a steep high pass filter. Such a steep high pass filter may have a cutoff frequency between 6000 Hz and 9000 Hz. Next in step 850 wave amplitudes may be associated with data that has been filtered with at least one of the high pass filters. Data points from a set of wave amplitude data may be analyzed by a curve fitting process, for example, a processor may perform a curve fitting process that generates data or curves like the curves of FIG. 3. Once the data has been "curve fit," apparent attenuation values or delayed apparent attenuation values may be identified in step 870. At this point in time both magnitude data and apparent amplitude data or delated apparent amplitude data may be evaluated to identify correlation coefficients as discussed in respect to FIG. 4. The correlation coefficient data may then be used to generate a set of bond index data as discussed in respect to FIG. 5.

Figure 9:
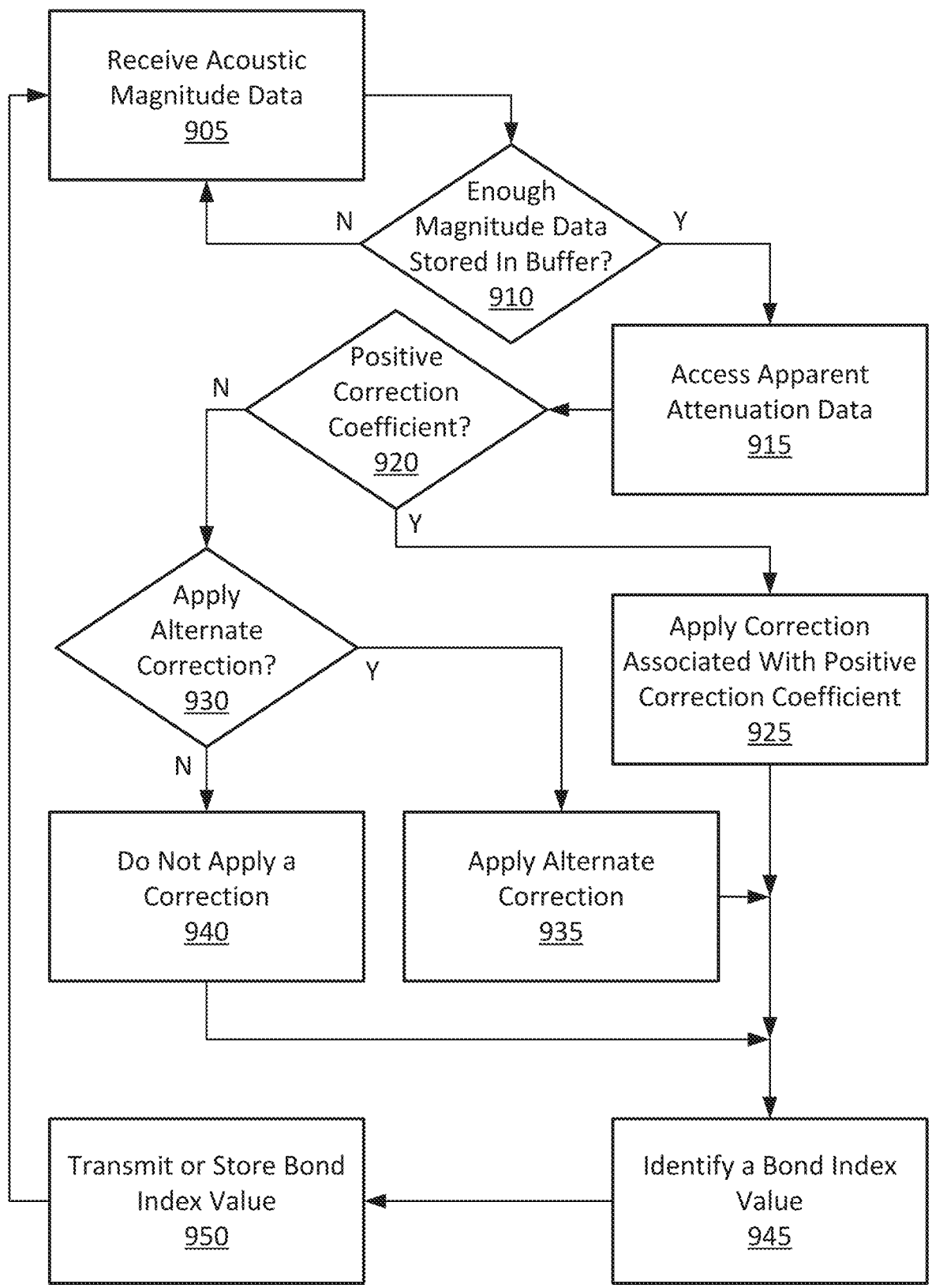
FIG. 9 illustrates a series of steps that may be performed when magnitudes of received acoustic data and apparent attenuation values are evaluated to identify bond index values to associate with specific portions of a wellbore in real-time.

FIG. 9 illustrates a series of steps that may be performed when magnitudes of received acoustic data and apparent attenuation values are evaluated to identify bond index values to associate with specific portions of a wellbore in real-time. The steps of FIG. 9 may be performed after the steps of FIG. 8 are performed. The data collection and evaluations of FIGS. 8-9 may be performed in real-time as a cementing operation is performed. As such bond indexes may be identified as cement is being pumped into a wellbore. Data that identifies an acoustic magnitude may be received in step 905. The acoustic magnitude data received in step 805 may be the same wave amplitude data identified in step 850 of FIG. 8. Determination step 910 may then identify whether a buffer that stores the magnitude data has received enough (a threshold amount of data) data, when no program flow may move back to step 905 where additional acoustic magnitude data is received.

When determination step 910 identifies that enough data is stored in the buffer, program flow may move to step 915 where a set of apparent attenuation data or delayed apparent attenuation data are accessed. The data accessed in step 815 may be the same data that was identified in step 870 of FIG. 8. Determination step 920 may then identify whether the currently evaluated magnitude or apparent attenuation data is associated with a positive correlation coefficient or the falling slope of curve 730 as discussed above. When determination step 920 identifies that the data being evaluated is associated with the positive coefficient or the aforementioned falling slope, program flow may move to step 925 where a correction is performed to generate a corresponding real attenuation value. This correction may be made as discussed in respect to FIGS. 4, 5, and/or 7.

When determination step 920 identifies that the data being evaluated is not associated with the positive coefficient or the aforementioned falling slope, program flow may move to determination step 930 that identifies whether an alternate correction should be performed. This may include comparing an attenuation value associated with a negative correlation coefficient or the positive slope of curve 730 with a correction threshold level. As discussed above corrections may be performed or applied on values of apparent attenuation or delated apparent attenuation according to the rules discussed in respect to FIGS. 4 and 7. When determination step 930 identifies that an alternate correction should be performed or applied, program flow may move to step 935 where that correction is performed or applied to generate a corresponding real attenuation value. When determination step 930 identifies that the correction should not be applied, program flow may move to step 940, where the apparent or delayed apparent attenuation value earlier identified is treated as a real attenuation value. After any of steps 925, 935, and 940, program flow moves to step 945 where a bond index value is identified. The bond index may be identified after generating a correlation coefficient as discussed in respect to FIG. 5.

Figure 10:
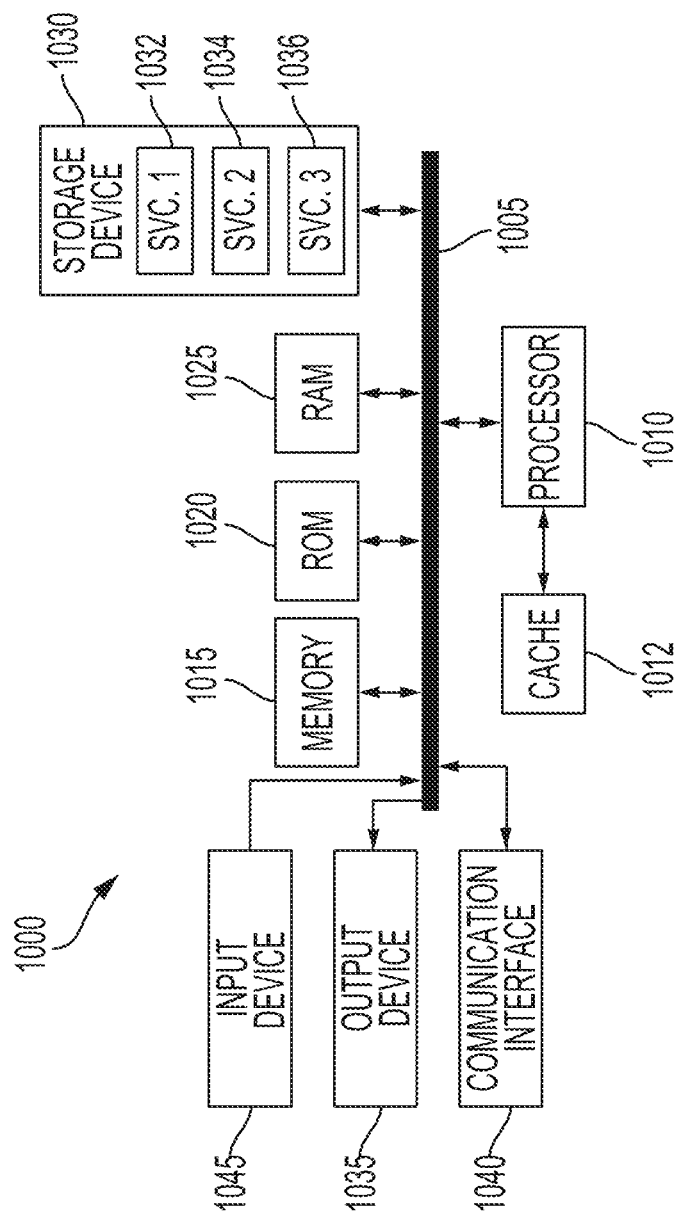
FIG. 10 illustrates an example computing device architecture which can be employed to perform various steps, methods, and techniques disclosed herein.

FIG. 10 illustrates an example computing device architecture 1000 which can be employed to perform various steps, methods, and techniques disclosed herein. Specifically, the computing device architecture can be integrated with the electromagnetic imager tools described herein. Further, the computing device can be configured to implement the techniques of controlling borehole image blending through machine learning described herein.

As noted above, FIG. 10 illustrates an example computing device architecture 1000 of a computing device which can implement the various technologies and techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device, etc. In some instances, multimodal computing devices can enable a user to provide multiple types of input to communicate with the computing device architecture 1000. The communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include services 1032, 1034, 1036 for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.
Statements of the Disclosure Include:

A method that includes the steps of accessing acoustic logging data gathered by a tool logging apparatus along a length of a casing of a wellbore, determining magnitudes to associate with acoustic reflections gathered by the tool as part of the acoustic logging data, determining attenuation values of the acoustic reflections from the acoustic logging data, and identifying correlation coefficient values to associate with the magnitudes and the attenuation values. These correlation coefficient values may have been identified based on comparisons between changes in the magnitudes and changes in the attenuation values. This method may also include identifying bonding index values to associate with attachment of the casing to a ground formation along the length of the casing based on the correlation coefficient values.

Methods of the present disclosure may be performed by a non-transitory computer-readable storage media, where a processor executes instructions out of a storage media such as a memory. Here again, the method may include accessing acoustic logging data gathered by a tool logging apparatus along a length of a casing of a wellbore, determining magnitudes to associate with acoustic reflections gathered by the tool as part of the acoustic logging data, determining attenuation values of the acoustic reflections from the acoustic logging data, and identifying correlation coefficient values to associate with the magnitudes and the attenuation values. These correlation coefficient values may have been identified based on comparisons between changes in the magnitudes and changes in the attenuation values. The processor may also execute instruction out of the memory to identify bonding index values to associate with attachment of the casing to a ground formation along the length of the casing based on the correlation coefficient values.

Apparatus that implement methods of the present disclosure may include a processor that executes instructions out of a memory to access acoustic logging data gathered by a tool logging apparatus along a length of a casing of a wellbore, determine magnitudes to associate with acoustic reflections gathered by the tool as part of the acoustic logging data, determine attenuation values of the acoustic reflections from the acoustic logging data, and identify correlation coefficient values to associate with the magnitudes and the attenuation values. These correlation coefficient values may have been identified based on comparisons between changes in the magnitudes and changes in the attenuation values. The processor may also execute instruction out of the memory to identify bonding index values to associate with attachment of the casing to a ground formation along the length of the casing based on the correlation coefficient values.

The acoustic signals accessed may have been received by the tool logging apparatus after a transmitter of the tool logging apparatus transmits acoustic signals that impact and travel along the casing of the wellbore toward a plurality of receivers. The acoustic data may be accessed to identify the changes in the magnitudes and the changes in the attenuation values at discrete moments in time and the processor may compare the magnitude changes with the attenuation value changes. When these correlation coefficient values may move in a positive direction when the magnitude changes and the attenuation value changes move in a same direction and may move in a negative direction when the magnitude changes and the attenuation value changes move in different directions.

Methods of the present disclosure may also include accessing summation model data, where a plot of the summation model data results includes a first portion of the plot that has a negative slope, here the plot may cross-reference apparent attenuation values with real attenuation values.

Other steps that may be performed include associating a first apparent attenuation value of the apparent attenuation values with the first portion of the plot that has the negative slope based on the first apparent attenuation value being a positive number, identifying a first real attenuation value based on a first correspondence that associates the summation model data with the apparent attenuation values with the real attenuation values, filtering acoustic reflection measurement data with a first high pass filter, generating time windows to associate with the reflected measurement data, filtering the acoustic measurement data with a second high pass filter, and identifying the magnitudes to associate with the acoustic reflections.

In certain instances, these methods may also or alternatively include generating a sliding window such that directions of the changes in the magnitudes and directions of the changes in the attenuation values can be compared, comparing the directions of the changes in the magnitudes and the directions of the changes in the attenuation values, and identifying a value to assign to a correlation coefficient based on the comparing of the directions of the changes in the magnitudes and the directions of the changes in the attenuation values. Attenuation values may be identified by accessing a first set of acoustic measurement data that includes more than two measurements of acoustic data, and identifying a slope associated with a curve fitted to the more than two measurements of the acoustic data, wherein the identified slope corresponds to the attenuation values.

Attenuation values used by the methods of the present disclosure may include identifying a first slope to associate with apparent attenuation values using data received by more than two receivers and associating this first slope with a first set of apparent attenuation values. Alternatively, or additionally, the attenuation values may include identifying the first slope, identifying a second slope based on acoustic data received by only two of receivers of a set of receivers, identifying a difference between the second slope and the first slope, and associating the slope difference with the attenuation values.

What is claimed is:

1. A computer-implemented method comprising:
    accessing acoustic logging data gathered by a tool logging apparatus along a length of a casing of a wellbore;
    determining magnitudes of acoustic energy in the acoustic logging data to associate with acoustic reflections gathered by the tool as part of the acoustic logging data;
    determining attenuation values of the acoustic reflections from the acoustic logging data;
    identifying correlation coefficient values to associate with the magnitudes and the attenuation values, the correlation coefficient values identified based on comparisons between changes in the magnitudes and changes in the attenuation values; and
    identifying bonding index values indicative of cement adhesion quality between the casing of the wellbore and a ground formation along the length of the casing based on the correlation coefficient values.

2. The computer-implemented method of claim 1, wherein identifying the correlation coefficient values based on the comparisons between the changes in the magnitudes and the changes in the attenuation values further comprises:
    identifying the changes in the magnitudes and the changes in the attenuation values at discrete moments in time, and
    comparing the magnitude changes with the attenuation value changes, wherein the identified correlation coefficient values:
    move in a positive direction when the magnitude changes and the attenuation value changes move in a same direction, and
    move in a negative direction when the magnitude changes and the attenuation value changes move in different directions.

3. The computer-implemented method of claim 1 further comprising:
    accessing summation model data, wherein a plot of the summation model data results includes a first portion of the plot that has a negative slope, the plot cross-referencing apparent attenuation values with real attenuation values;
    associating a first apparent attenuation value of the apparent attenuation values with the first portion of the plot that has the negative slope based on the first apparent attenuation value being a positive number; and
    identifying a first real attenuation value based on a first correspondence that associates the summation model data with the apparent attenuation values with the real attenuation values.

4. The computer-implemented method of claim 3 further comprising:
    associating a second apparent attenuation value of the apparent attenuation values with a second portion of the plot that has the positive slope based on the second apparent attenuation value being a negative number; and
    identifying a second real attenuation value based on a second correspondence that associates the summation model data with the apparent attenuation values with the real attenuation values.

5. The computer-implemented method of claim 1, wherein the reflections are received by a plurality of receivers of a well logging apparatus.

6. The computer-implemented method of claim 1, further comprising:
    filtering acoustic reflection measurement data with a first high pass filter;
    generating time windows to associate with the reflected measurement data;
    filtering the acoustic measurement data with a second high pass filter; and
    identifying the magnitudes to associate with the acoustic reflections.

7. The computer-implemented method of claim 6, wherein the first high pass filter has a cut-off frequency between 1000 Hertz (Hz) and 4000 Hz.

8. The computer-implemented method of claim 6, wherein the second high pass filter has a cut-off frequency between 6000 Hz and 9000 Hz.

9. The computer-implemented method of claim 2, wherein the discrete moments in time are identified based on a sliding timing window that correlates the magnitudes and the attenuation values at the discrete moments in time.

10. The computer-implemented method of claim 1, further comprising:
generating a sliding window such that directions of the changes in the magnitudes and directions of the changes in the attenuation values can be compared;
comparing the directions of the changes in the magnitudes and the directions of the changes in the attenuation values; and
identifying a value to assign to a correlation coefficient based on the comparing of the directions of the changes in the magnitudes and the directions of the changes in the attenuation values.

11. The computer-implemented method of claim 1, wherein the identifying of the attenuation values include:
accessing a first set of acoustic measurement data that includes more than two measurements of acoustic data; and
identifying a slope associated with a curve fitted to the more than two measurements of the acoustic data, wherein the identified slope corresponds to the attenuation values.

12. The computer-implemented method of claim 1, wherein the identifying of the attenuation values include:
accessing a first set of acoustic measurement data that includes more at least three measurements of acoustic data;
identifying a first slope associated with a curve fitted to the more than two measurements of the acoustic data;
identifying a second slope associated with a line that connects two measurement points of the at least three measurement points; and
identifying a difference of the first slope and the second slope, wherein the identified slope difference corresponds to the attenuation values.

13. A non-transitory computer-readable storage medium having embodied thereon a program executable by a processor to implement a method comprising:
accessing acoustic logging data gathered by a tool logging apparatus along a length of a casing of a wellbore;
determining magnitudes of acoustic energy in the acoustic logging data to associate with acoustic reflections gathered by the tool as part of the acoustic logging data;
determining attenuation values of the acoustic reflections from the acoustic logging data;
identifying correlation coefficient values to associate with the magnitudes and the attenuation values, the correlation coefficient values identified based on comparisons between changes in the magnitudes and changes in the attenuation values; and
identifying bonding index values indicative of cement adhesion quality between the casing of the wellbore and a ground formation along the length of the casing based on the correlation coefficient values.

14. The non-transitory computer-readable storage medium of claim 13, wherein identifying the correlation coefficient values based on the comparisons between the changes in the magnitudes and the changes in the attenuation values further comprises the processor performing the steps of:
identifying the changes in the magnitudes and the changes in the attenuation values at discrete moments in time, and
comparing the magnitude changes with the attenuation value changes, wherein the identified correlation coefficient values:
move in a positive direction when the magnitude changes and the attenuation value changes move in a same direction, and
move in a negative direction when the magnitude changes and the attenuation value changes move in different directions.

15. The non-transitory computer-readable storage medium of claim 13, the program further executable by the processor to:
access summation model data, wherein a plot of the summation model data results includes a first portion of the plot that has a negative slope, the plot cross-referencing apparent attenuation values with real attenuation values;
associate a first apparent attenuation value of the apparent attenuation values with the first portion of the plot that has the negative slope based on the first apparent attenuation value being a positive number; and
identify a first real attenuation value based on a first correspondence that associates the summation model data with the apparent attenuation values with the real attenuation values.

16. The non-transitory computer-readable storage medium of claim 15, the program further executable by the processor to:
associate a second apparent attenuation value of the apparent attenuation values with a second portion of the plot that has the positive slope based on the second apparent attenuation value being a negative number; and
identify a second real attenuation value based on a second correspondence that associates the summation model data with the apparent attenuation values with the real attenuation values.

17. The non-transitory computer-readable storage medium of claim 13, wherein the reflections are received by a plurality of receivers of a well logging apparatus.

18. The non-transitory computer-readable storage medium of claim 13, the program further executable by the processor to:
filter acoustic reflection measurement data with a first high pass filter;
generate time windows to associate with the reflected measurement data;
filter the acoustic measurement data with a second high pass filter; and
identify the magnitudes to associate with the acoustic reflections.

19. The non-transitory computer-readable storage medium of claim 13, the program further executable by the processor to:
generate a sliding window such that directions of the changes in the magnitudes and directions of the changes in the attenuation values can be compared;
compare the directions of the changes in the magnitudes and the directions of the changes in the attenuation values; and
identify a value to assign to a correlation coefficient based on the comparing of the directions of the changes in the magnitudes and the directions of the changes in the attenuation values.

20. An apparatus comprising:
a memory; and
a processor that executes instructions out of the memory to:
access acoustic logging data gathered by a tool logging device along a length of a casing of a wellbore,
determine magnitudes of acoustic energy in the acoustic logging data to associate with acoustic reflections gathered by the tool as part of the acoustic logging data,
determine attenuation values of the acoustic reflections from the acoustic logging data,
identify correlation coefficient values to associate with the magnitudes and the attenuation values, the correlation coefficient values identified based on comparisons between changes in the magnitudes and changes in the attenuation value; and
identify bonding index values indicative of cement adhesion quality between the casing of the wellbore and a ground formation along the length of the casing based on the correlation coefficient values.

* * * * *